US009471119B2

(12) United States Patent
Dayka et al.

(10) Patent No.: US 9,471,119 B2
(45) Date of Patent: Oct. 18, 2016

(54) DETECTION OF DELETED RECORDS IN A SECURE RECORD MANAGEMENT ENVIRONMENT

(71) Applicant: International Business Machines Corporation, Armonk, NY (US)

(72) Inventors: John C. Dayka, New Paltz, NY (US); Mark A. Nelson, Poughkeepsie, NY (US); Donald W. Schmidt, Stone Ridge, NY (US); Anthony T. Sofia, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/276,334

(22) Filed: May 13, 2014

(65) Prior Publication Data

US 2015/0333913 A1 Nov. 19, 2015

(51) Int. Cl.
| | |
|---|---|
| *H04L 29/06* | (2006.01) |
| *G06F 1/24* | (2006.01) |
| *G06F 21/64* | (2013.01) |
| *H04L 9/32* | (2006.01) |

(52) U.S. Cl.
CPC ............. *G06F 1/24* (2013.01); *G06F 21/64* (2013.01); *H04L 9/3247* (2013.01); *H04L 29/06* (2013.01); *H04L 63/12* (2013.01); *H04L 9/3281* (2013.01); *H04L 9/3294* (2013.01)

(58) Field of Classification Search
CPC ... H04L 9/3247; H04L 63/12; H04L 9/3249; H04L 9/3252; H04L 2463/121; H04L 9/3297; H04L 9/3242; H04L 9/3236; G06F 1/24; G06F 21/16; G06F 21/64; G06F 2221/2151; G06F 21/6227; G11B 20/00884

USPC .................................................. 713/176–181
See application file for complete search history.

(56) References Cited

U.S. PATENT DOCUMENTS

| | | | | |
|---|---|---|---|---|
| 6,587,945 | B1 * | 7/2003 | Pasieka | G06F 21/6209 705/3 |
| 7,461,233 | B2 * | 12/2008 | Hsieh et al. | 711/216 |
| 7,966,644 | B2 * | 6/2011 | Noda | G06F 21/6218 713/176 |
| 8,230,228 | B2 | 7/2012 | Hahn et al. | |
| 2002/0103865 | A1 * | 8/2002 | Lilly | H04L 67/42 709/205 |

(Continued)

OTHER PUBLICATIONS

Tezuka et al.; ADEC: Assured Deletion and Verifiable Version Control for Cloud Storage, 26th ieee International Conference on Advanced Information Networking and Applicaitons; Tokyo, JP; 2012; 8 pp.

(Continued)

*Primary Examiner* — Nirav B Patel
(74) *Attorney, Agent, or Firm* — Cantor Colburn LLP; William A. Kinnaman, Jr.

(57) ABSTRACT

An automated secure record management system and method that receives a plurality of digitally signed records subsequent to a resetting of a running counter. In response to each received digitally signed record, the automated secure record management system and method increments the running counter. Further, upon receiving an accumulation record, automated secure record management system and method compares a value of the running counter and a signature record number of the accumulation record, such that a notification is generated whenever the comparison detects that the value of the running counter is not equal to the signature record number.

13 Claims, 5 Drawing Sheets

(56) References Cited

U.S. PATENT DOCUMENTS

| | | |
|---|---|---|
| 2002/0161742 A1* | 10/2002 | Heiden et al. ............... 707/1 |
| 2003/0182552 A1* | 9/2003 | Tanimoto et al. ........... 713/170 |
| 2003/0220903 A1 | 11/2003 | Mont et al. |
| 2004/0083240 A1 | 4/2004 | Sekine |
| 2006/0015500 A1* | 1/2006 | Heiden .......................... 707/9 |
| 2007/0226229 A1* | 9/2007 | Psounis et al. .............. 707/10 |
| 2008/0120320 A1 | 5/2008 | Chambliss et al. |
| 2008/0137130 A1* | 6/2008 | Ferlitsch ...................... 358/1.15 |
| 2008/0244704 A1* | 10/2008 | Lotter ................. G06F 21/552 726/3 |
| 2008/0301457 A1* | 12/2008 | Uesugi et al. ............... 713/178 |
| 2009/0030949 A1* | 1/2009 | Saito ........................... 707/200 |
| 2009/0259669 A1 | 10/2009 | Abbruzzi et al. |
| 2010/0088528 A1 | 4/2010 | Sion |
| 2011/0071986 A1 | 3/2011 | Schmidt et al. |
| 2012/0259894 A1 | 10/2012 | Varley et al. |
| 2012/0284226 A1 | 11/2012 | Loo |
| 2013/0013598 A1 | 1/2013 | Kohn et al. |

OTHER PUBLICATIONS

IP.com et al.; A Maintenance Fee Database Table Using a Hush Key Created From a Epoch Date, IPCOM000160586D; Nov. 21, 2007; 4 pp.

* cited by examiner

DETECTION OF DELETED RECORDS IN A SECURE RECORD MANAGEMENT ENVIRONMENT

BACKGROUND

The disclosure relates generally to secure record management, and more specifically, to long-term secure record management of computing logs and data by a record management facility.

In general, increased regulations and auditing has driven the need for computing logs that provide long-term secure record management through data and record tracking. Yet, current mechanisms are limited to only identifying 'whether' something is wrong with the data or logs and not 'what' is wrong.

Further, the long-term nature of computing logs and current data storage methods inherently permit ample opportunity for tampering, and more particularly deleting or adding of at least a portion of the logs or associated data by anyone with access to the record management facility, such as system administrators.

SUMMARY

According to one embodiment of the present invention, an automated secure record management system and method that receives a plurality of digitally signed records subsequent to a resetting of a running counter. In response to each received digitally signed record, the automated secure record management system and method increments the running counter. Further, upon receiving an accumulation record, automated secure record management system and method compares a value of the running counter and a signature record number of the accumulation record, such that a notification is generated whenever the comparison detects that the value of the running counter is not equal to the signature record number.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
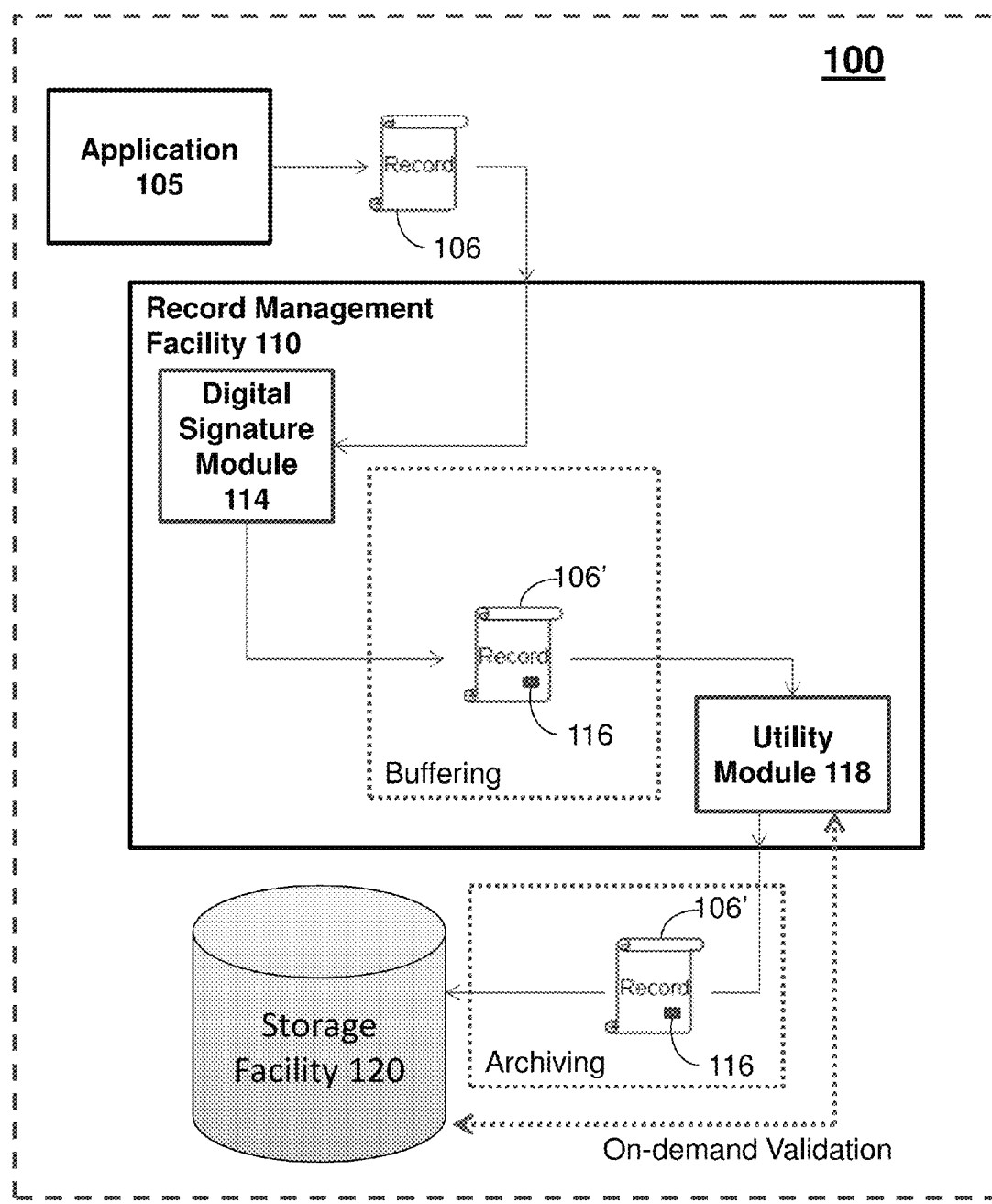
FIG. 1 illustrates an exemplary automated secure record management system.

As indicated above, the long-term nature of computing logs and current data storage methods inherently permit ample opportunity for tampering, and more particularly deleting or adding of at least a portion of the logs or associated data by anyone with access to the record management facility, such as system administrators. Thus, what is needed is an automated secure record management system and method that may detect, identify, and report computing log and/or data tampering.

In general, embodiments of the present invention disclosed herein may include an automated secure record management system, method, and/or computer program product that detects, identifies, and reports tampering with computing logs, and particularly unauthorized deletions, additions, and/or modifications of data.

The automated secure record management system and method generally detects tampering and identifies deletions/additions/modifications by generating validation data and performing on-demand validation. Generating validation data includes generating digitally signatures for original data and generating accumulation records at specific time intervals memorializing an interval count of the original data. Performing on-demand validation includes processing the original data against the digitally signature information and comparing a running count of the processed data with the interval count of the accumulation records. Thus, if at any time the digital signatures do not validate against the original data and/or the running count does not match the interval count, the automated secure record management system and method utilizes the validation data to intelligently determine what is wrong with the original data and provide notifications describing the issue.

Systems and/or computing devices, such as an automated secure record management system (e.g., system 100 and computing device 200 below), may employ any of a number of computer operating systems, including, but by no means limited to, versions and/or varieties of the AIX UNIX operating system distributed by International Business Machines of Armonk, N.Y., the Microsoft Windows operating system, the Unix operating system (e.g., the Solaris operating system distributed by Oracle Corporation of Redwood Shores, Calif.), the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, a notebook, a laptop, a network device, or handheld computer, or some other computing system and/or device.

In general, computing devices further may include a processor (e.g., a processor 202) and a computer readable storage medium (e.g., a memory 203), where the processor receives computer readable program instructions, e.g., from the computer readable storage medium, and executes these instructions, thereby performing one or more processes, including one or more of the processes described herein (e.g., detecting tampering by generating validation data and performing on-demand validation).

Computer readable program instructions may be compiled or interpreted from computer programs created using assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the computing device (e.g., a user's computer), partly on the computing device, as a stand-alone software package, partly on a local computing device and partly on a remote computer device or entirely on the remote computer device. In the latter scenario, the remote computer may be connected to the local computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Computer readable program instructions described herein may also be downloaded to respective computing/processing devices from a computer readable storage medium or to an external computer or external storage device via a network (e.g., any combination of computing devices and connections that support communication). For example, a network may be the Internet, a local area network, a wide area network and/or a wireless network and comprise copper transmission cables, optical transmission fibers, wireless transmission, routers, firewalls, switches, gateway computers and/or edge servers.

Computer readable storage mediums may be a tangible device that retains and stores instructions for use by an instruction execution device (e.g., a computing device as described above). A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Thus, the automated secure record management system and method and/or elements thereof may be implemented as computer readable program instructions on one or more computing devices (e.g., computer workstation, server, desktop, etc.), stored on computer readable storage medium associated therewith. A computer program product may comprise such computer readable program instructions stored on computer readable storage medium for carrying and/or causing a processor to carry out the of the automated secure record management system and method.

FIG. 1 illustrates an exemplary automated secure record management system 100, wherein an application 105 communicates original records, such as computing logs, data, and/or records (e.g., record 106), to a record management facility 110. The system 100 and elements therein may take many different forms and include multiple and/or alternate components and facilities. While an exemplary system 100 is shown in FIG. 1, the exemplary components illustrated in FIG. 1 are not intended to be limiting. Indeed, additional or alternative components and/or implementations may be used.

The application 105 may include computer readable instructions designed to perform and/or cause a computing device (not shown) to perform an activity or task beyond the running of the computing device (e.g., the application 105 may generally be included within a computing device employing a computer operating system such as one of those mentioned above, and are accessed via a network in any one or more of a variety of manners). The application 105, upon completing the activity or task, generates and communicates a record 106 documenting that activity or task to the record management facility 110. The record 106 is a digital representation of an activity or task and/or a log of that activity or task that may be processed within the system 100, as further described below. The record 106 may include a timestamp that represents a date and/or time at which the application 105 created or communication the record 106 to the record management facility 110. While single items are illustrated for the application 105 and the record 106 (and other items) by FIG. 1, these representations are not intended to be limiting and thus, the application 105 and the record 106 items may represent a plurality of applications that generate and communicate a plurality of records.

The record management facility 110 may include a computing device with a processor and a memory configured to accept and hold the record 106 from the application 105 (e.g., in cache, in buffers, and/or on disks). As the record 106 is communicated to the record management facility 110, the facility 110 increments an interval counter so that a value of the interval counter represents a number of records (106) received by the facility 110. The record management facility 110 further processes the record 106 and the value of the interval counter by utilizing a digital signature module 114 to generate a validation data (e.g., digitally signed duplicates of original records and accumulation records).

The digital signature module 114 may include computer readable program instructions configured to generate and/or associate a unique digital signature (e.g., a mathematical scheme for demonstrating the authenticity and/or order of a digital message or document) for the record 106 to produce a signature 116. In general, a digital signature is generated by hashing a record being signed and then encrypting with the signer's private key the hashed record.

The digital signature module 114 also generates a counter record at configured time intervals memorializing the value of the interval counter and generates and/or associates a unique digital signature with the counter record to produce an accumulation record. The accumulation record thus includes a number of records provided to the record management facility 110 during a current time interval (e.g., a signature record number that memorializes/records the value of the interval counter, the value representing the number of received computing logs, data, and/or records at the time the accumulation record was generated). The accumulation record may include a flag that indicates or marks if a current accumulation record is a first record in a series (e.g., the first record after an application 210 start-up) and a timestamp that represents a date and/or time at which it was created by the digital signature module 114. The accumulation record may also include multiple combinations of timestamps, examples of which include when that particular accumulation record was generated, a previous accumulation record, and an expected subsequent accumulation record.

The record management facility 110 further buffers the digitally signed record 106' (and any accumulation records), which includes the signature 116, in preparation for archiving. A utility module 118 may include computer readable program instructions configured to archive the record 106 and the digitally signed record 106' (and any accumulation records) in a storage facility 120 for long-term storage.

Figure 2:
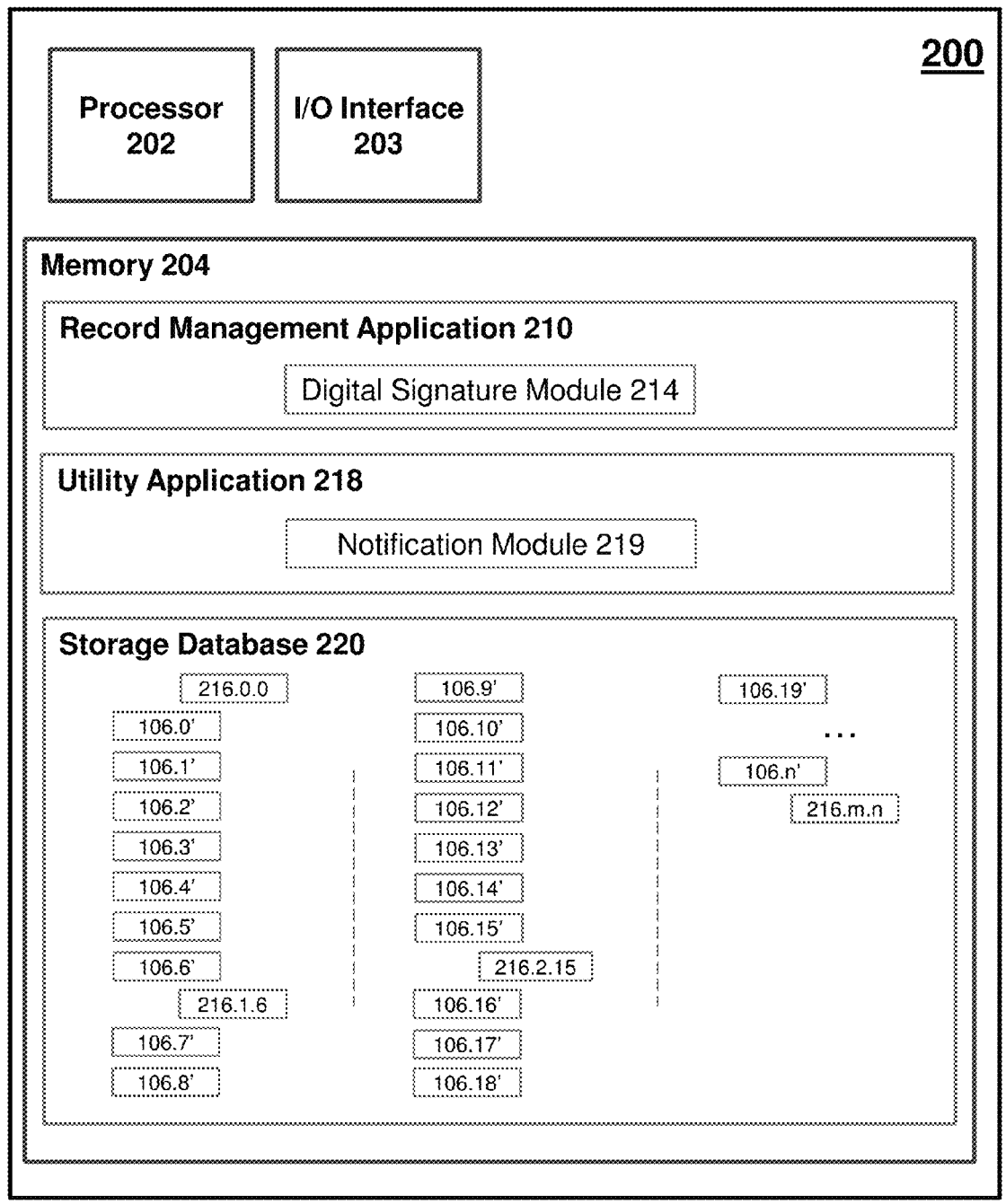
FIG. 2 illustrates an exemplary computing device schematic configured to provide automated secure record management.

The storage facility 120 may include a database, data repository or other data store and may include various kinds of mechanisms for storing, accessing, and retrieving various kinds of data, including a hierarchical database, a set of files in a file system, an application database in a proprietary format, a relational database management system (RD-BMS), etc. The storage facility 120 may generally be included within a computing device employing a computer operating system such as one of those mentioned above, and are accessed via a network in any one or more of a variety of manners. The utility module 118 and/or the storage facility 120 may be a part of the record management facility 110 (as illustrated in FIG. 1), run independently within the same device or system as the record management facility 110 (as illustrated in FIG. 2), or be an external to and in communication with the record management facility 110.

The utility module 118 is configured to perform on-demand validation. That is, the utility module 118 performs on-demand validation of the original and validation data archived on the storage facility 120, such as by processing the original data against the digitally signatures and by comparing a running count of the processed data with the interval count of the accumulation records.

For example, to process the original data against the digital signatures, the utility module 118 may validate each record set, i.e., validate the digitally signed record 106' against its corresponding signature 116. For instance, the utility module 118 may decrypts the digital signature of the received digitally signed record 106' using a public key corresponding to a signer's private key; generate a hash from the received digitally signed record 106'; and compare the decrypted hash with currently generated hash. If the hashes don't match, the received digitally signed record 106' was altered from a corresponding record 106 used to create the digital signature. In turn, when the utility module 118 detects that the digitally signed record 106' does not match its corresponding signature 116 (in the sense that the two hashes match), then that digitally signed record 106' is marked as invalid. The utility module 118 may further identify in what manner the record 106 does not match its corresponding signature 116 (e.g., identify how the record 106 was manipulated), generate a notification itemizing that manner, and communicate the notification to a plurality of users responsible for regulating and auditing the automated secure record management system. As another example, the utility module 118 may validate whether the original records are being processed in-order. That is, the utility module 118 may compare the timestamp of the digitally signed record 106' with other adjacent original records and/or verify that the corresponding signature 116 is in sequence with the other adjacent digital signatures.

Further, as each record set is processed (e.g., validated), the utility module 118 increments a running counter so that a value of the running counter represents a number of record sets processed. In turn, the utility module 118, upon encountering an accumulation record, compares the value of the running count with the interval count of that accumulation record. If the utility module 118 detects that the running count does not match the interval count, then the utility module 118 automatically generates a notification (identifying the addition or subtraction of records) to the users responsible for regulating and auditing the automated secure record management system. Therefore, the utility module 118 may validate whether the accumulation records are being processed in-order. That is, the utility module 118 may compare the timestamp of an encountered accumulation record with other adjacent accumulation records and/or verify that the digital signature of the encountered accumulation is in sequence with the other adjacent digital signatures. In turn, if the utility module 118 detects that the encountered accumulation record does not have a valid digital signature, has a digital signature out of sequence, and/or a timestamp out of sequence, then the utility module 118 automatically generates a notification (identifying the addition or subtraction of records) to the users responsible for regulating and auditing the automated secure record management system.

FIG. 2 illustrates an exemplary computing device 200 (e.g., a computing device as described above) configured to provide automated secure record management that includes a processor 202, an input/output interface 203, and a memory 204. The processor 202 may receive computer readable program instructions from the memory 204 and execute these instructions, thereby performing one or more processes defined by a record management application 210 or a utility application 218 (e.g., detecting tampering by generating validation data and performing on-demand validation).

The processor 202 may include any processing hardware, software, or combination of hardware and software utilized by the computing device 200 that carries out the computer readable program instructions by performing arithmetical, logical, and/or input/output operations. Examples of the processor 202 include, but are not limited to an arithmetic logic unit, which performs arithmetic and logical operations; a control unit, which extracts, decodes, and executes instructions from memory; and an array unit, which utilizes multiple parallel computing elements.

The input/output (I/O) interface 203 may include a physical and/or virtual mechanism utilized by the computing device 200 to communicate between elements internal and/or external to the computing device 200. That is, the I/O interface 203 may be configured to receive or send signals or data within or for the computing system 200. An example of the I/O interface 203 may include a network adapter card or network interface configured to receive computer readable program instructions from a network and forward the computer readable program instructions, original records, or the like for storage in a computer readable storage medium (e.g., memory 204) within the respective computing/processing device (e.g., computing device 200).

The memory 204 may include a tangible device that retains and stores computer readable program instructions, as provided by the record management application 210 or the utility application 218, for use by the processor 202 of the computing device 200.

The record management application 210 may include computer readable program instructions configured to receive and manage records (e.g., in cache, in buffers, and/or on disks) from external sources in preparation for archiving. The application 210 includes an interval counter that is configured to increment a value representing a number of records received. The application 210 is configured to process the received records and the value of the interval counter by utilizing a digital signature module 214 to generate validation data, along with manage time intervals associated with the interval counter. The digital signature module 214 may include computer readable program instructions configured to generate validation data by digitally signing the received records. The digital signature module 214 is configured to, at configured time intervals, memorialize the value of the interval counter in a digitally signed counter record, i.e., an accumulation record.

The utility application 218 may include computer readable program instructions configured to archive records (e.g., original records, digitally signed records, and accumulation records), as record sets, in a storage database 220 of the memory 204 for long-term storage. The application 218 is configured to propagate the digital signatures along with counter records when managing or handling the offload (e.g., the archiving) of buffered records. The application 218 is further configured to perform on-demand validation of the archived record sets in the storage database 220. The application 218 includes a running counter that is configured to increment a value representing a number of record sets validated. The application 218 is configured to output notifications by utilizing a notification module 219 based on the performance of the on-demand validation. The notification module 219 may include computer readable program instructions configured to generate notifications itemizing issues (e.g., what is wrong with the archive) detected by the on-demand validation via notifications. A notification is a mechanism for delivering a message, identifying how the archived records were manipulated, added to, or subtracted from, to the users responsible for regulating and auditing the secure record management of the computing device 200. Examples of notifications may include, but are not limited to, text messaging (e.g., SMS), audio alerts (e.g., telephone calls, cellphone calls, VoIP calls, voicemails, loudspeaker announcements, etc.), electronic mail (e.g., POP, IMAP, SMTP), desktop alerts (e.g., dialog, balloon, modal window, toast, etc.), pager (e.g., SNPP), instant messaging (e.g., IRC, ICQ, AIM, Yahoo! Messenger, MSN, XMPP, iMessage), and the like.

While single items are illustrated for the applications 210, 218 (and other items) by FIG. 2, these representations are not intended to be limiting and thus, the application 210, 218 items may represent a plurality of applications. For example, multiple utility applications 218 in different locations may be utilized to archive the stored data, and in turn those same applications may be used for on-demand validation. In addition, although one modular breakdown of the applications 210, 218 is offered, it should be understood that the same functionality may be provided using fewer, greater, or differently named modules. Although it is not specifically illustrated in the figures, the applications 210, 218 may further include a user interface module and an application programmable interface module; however, these modules may be integrated with any of the above named modules. A user interface module may include computer readable program instructions configured to generate and mange user interfaces that receive inputs and present outputs. An application programmable interface module may include computer readable program instructions configured to specify how other modules, applications, devices, and systems interact with each other.

The storage database 220 may include a database, as described above, capable of storing records. The storage database 220 is in communication with the applications 210, 218 of and/or applications external to the computing device 200, such that original records and validation data may be archived in support of the processes described herein (e.g., detecting tampering by generating validation data and performing on-demand validation). As illustrated in FIG. 2, the storage database 220 includes an exemplary number of records archived based on one set of received original records. The records archived include digitally signed records 106.0' to 106.$n$' and accumulation records 216.0.0 to 216.$m.n$, where '$n$' is an integer representing both the record number and order in which that record was received or generated and '$m$' is an integer related to the number of time intervals that have lapsed since the beginning of the series. Thus, if a series of '$m$' intervals has elapsed, then the accumulation record 216.1.6 would indicate the end of the first interval (e.g., 216. '1' 0.6) and indicate that seven records were received at the end of that first interval (e.g., 216.1. '6'-records zero through six). Further, the accumulation record 216.$m.n$ would indicate that '$n$' records were received at the end of the '$m$' interval. In this example, the '$n$' integer of the accumulation record 216 corresponds to the value of the interval counter at the time of generating that accumulation record, as further described below with reference to FIG. 3. Although one exemplary numbering sequence for the archived records of the storage database 220 is offered, it should be understood that the same operability may be provided using fewer, greater, or differently implemented sequences. For example, since the '$n$' integer of the digitally signed records 106.$n$' and the accumulation records 216 corresponds to the value of the interval counter, the '$n$' integer of these records may indicate only the number of records received during an interval when the interval counter is reset after each configured time interval.

Figure 3:
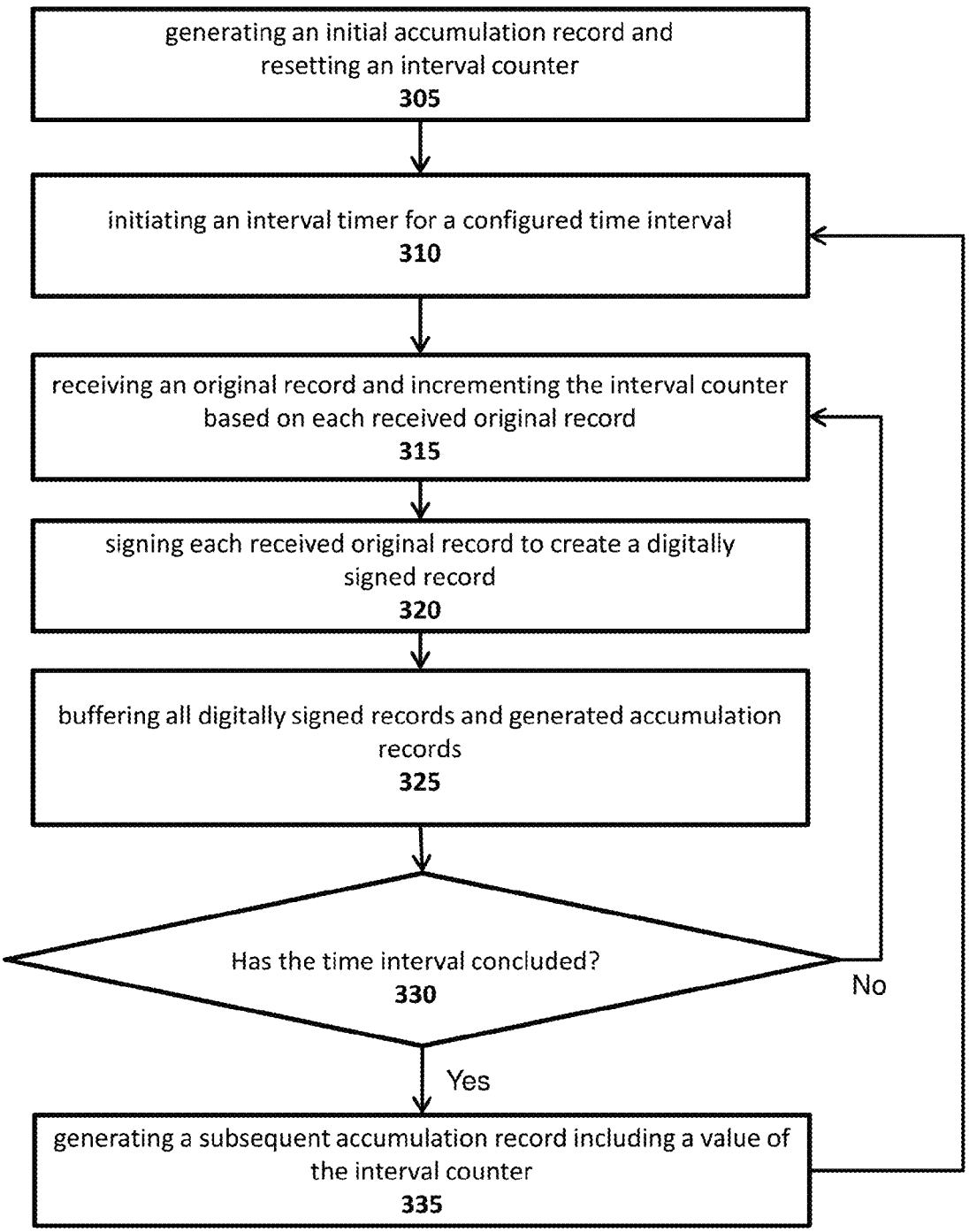
FIG. 3 illustrates an exemplary process flow of an automated secure record management system.

The creation and storage of the archived records by the applications 210 and 218 will be described with reference to FIG. 3. FIG. 3 illustrates an exemplary process flow of an automated secure record management system for creating validation data.

The process 300 begins at block 305 when the digital signature module 214 of the record management application 210 generates an initial validation datum, such as a first accumulation record 216.0.0, and resets an interval counter to a first value. That is, the application 210 may start the validation data generation process by resetting an interval counter of the application 210 to first value, e.g., zero, and writing or copying that first value to a counter record via the digital signature module 214. The digital signature module 214 generates and/or associates a unique digital signature with the counter record to produce the first accumulation record 216.0.0. The application 210 also sets a flag of the first accumulation record 216.0.0 to a Boolean HIGH to indicate that the first accumulation record 216.0.0 is an initial accumulation record in a series of accumulation records (e.g., the series including records 216.0.$n$ to 216.$m.n$).

At block 310, the application 210 also initiates an interval timer for a configured time interval. The configured time interval may be a pre-determined amount of time in which a user wishes the application 210 to generate validation data. For example, the configured time interval may be a value at or less than five seconds, thirty seconds, one minute, five minutes, thirty minutes, one hour, six hours, twelve hours, one day, one, week, etc.

The process 300 proceeds to block 315 where the application 210 increments the interval counter from the first value in response to each original record received. In response to receiving each original record, the application 210 then digitally signs each original record (e.g., digitally signed records 106.n') by generating and/or associating a unique digital signature with that record, as indicated at block 320. These records (e.g., 116.n') are then buffered 325 by the application 210 in preparation for archiving, as indicated at block 325.

The process 300 proceeds to decision block 330 where the application 210 then checks as to whether the time interval of the interval timer has concluded. So long as the time interval has not concluded ('NO'), the process 300 returns to blocks 315, 320 and 325 where the application 210 continues to receive, sign, and buffer records, along with continuing to increment the interval counter. Once the time interval has concluded at decision block 330 ('YES'), the process 300 proceeds to block 335 where the application 210 generates a subsequent accumulation record, which includes a value of the interval counter. This may be repeated by the application 210 for a pre-determined time, a pre-determined number of intervals, and/or until a total amount of original records has been received. As another example, each time the number of records is written or copied from the interval counter by the application 210 into an accumulation record, the interval counter may be reset to a first value along with the resetting of the interval timer, which permits the set of records received to be counted on an interval basis.

At any time during the buffering of records by the application 210, the utility application 218 may archive those records in the storage database 210. Further, each signature record may be logically, spatially, and/or temporally located near each corresponding record. For example, each corresponding digitally signed records 106.n' is spatially stored in sequence, and each accumulation record 216.m.n is specially stored at the end of each corresponding interval.

Figure 4:
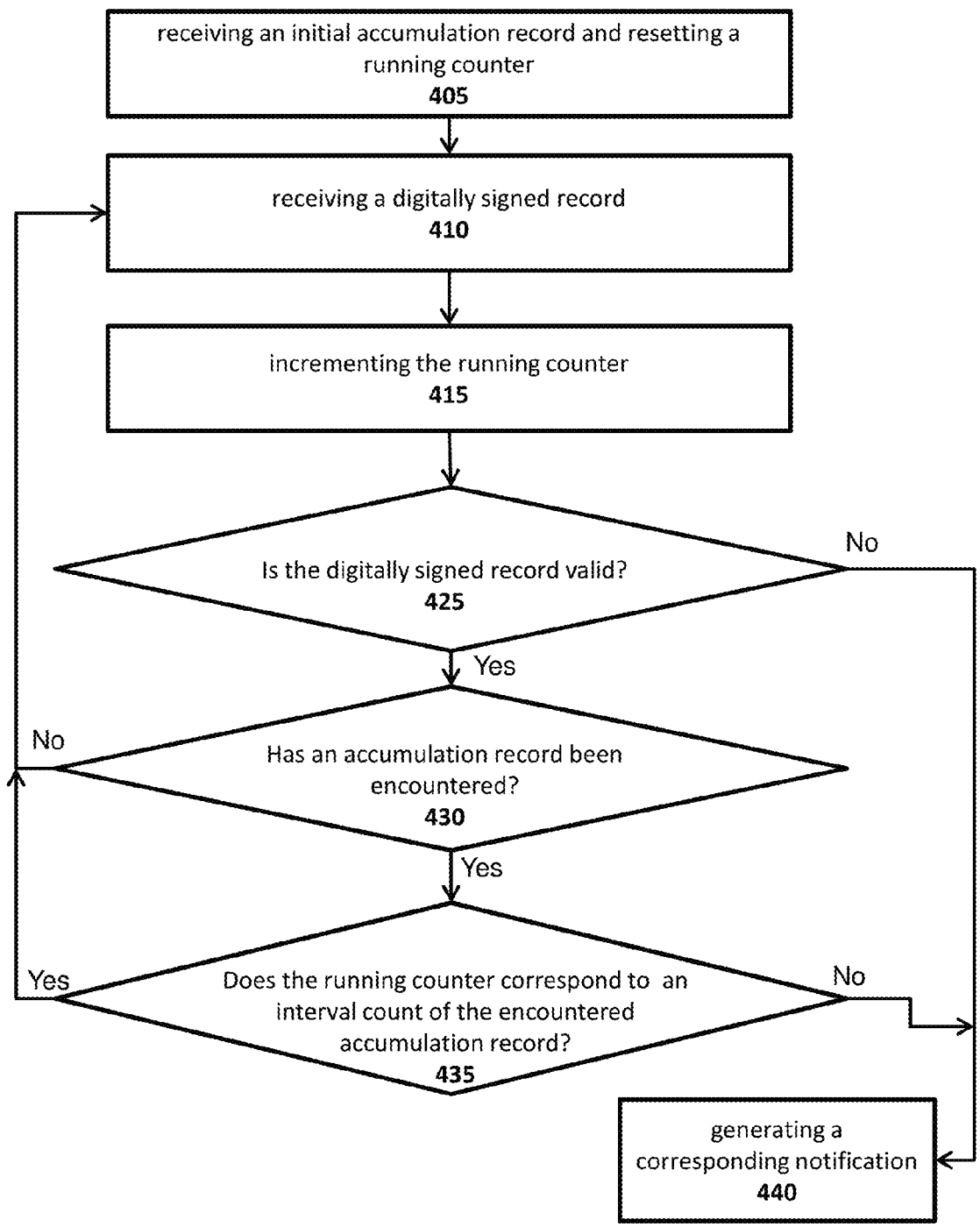
FIG. 4 illustrates an exemplary process flow of an automated secure record management system.

On-demand validation by the applications 210 and 218 will be described with reference to FIG. 4. FIG. 4 illustrates an exemplary process flow of an automated secure record management system. In this example, on-demand validation is described by streaming records in sequence from the storage database 220 by the utility application 218. As illustrated in FIG. 4, the process 400 starts at block 405 by the utility application 218 resetting a running counter in response to receiving an initial accumulation record 216.0.0 in the stream. As illustrated at block 410, the utility application 218 then receives a plurality of record sets, each record set including a plurality of digitally signed records (e.g., interval one includes six digitally signed records where record five is digitally signed records 106.4'). The utility application 218 then increments the running counter in response to each record of the plurality of digitally signed records is received, as shown at block 415, and further checks whether each digitally signed record (e.g., record 106.4') is valid against its corresponding digital signature at decision block 425.

If the digitally signed record is not valid ('NO') against the corresponding digital signature, the process 400 proceeds to block 440 where the application 210 utilizes the notification module 219 to generate a notification that corresponds to a type of invalidity detected by the check at decision block 425 (e.g., corresponds to the type of tampering). On the other hand, if the original record is valid ('YES') against the corresponding digital signature, the process 400 proceed to decision block 430 where the application 218 determines whether an accumulation record has been encountered within the stream.

If the accumulation record has not been received ('NO'), the process 400 loops back to blocks 410, 415 and decision block 425 where the application 210 continues to receive record sets, increment the running counter, and perform the validity check on each received digitally signed record. Conversely, if at decision block 430 the accumulation record has been received ('YES'), the process 400 proceeds to decision block 435 where the application 218 compares whether a value of the running counter and a signature record number of the received accumulation record are equal.

If the running counter and the signature record number are equal ('YES'), the process 400 loops back to blocks 410, 415 and decision block 425 as described above where the application 210 continues to receive 41 record sets, increment the running counter, and perform the validity check on the received digitally signed record. On the other hand, if it is determined at decision block 435 that the running counter and the signature record number are not equal ('NO'), the process 440 proceeds to block 440 where the application 218 generates a notification by utilizing the notification module 219 that corresponds to a type of inequality detected by the check 435 (e.g., whether the running counter is greater than or less than the signature record number, thereby indicating that at least one original record was respectively added to or subtracted from the archive records).

Figure 5:
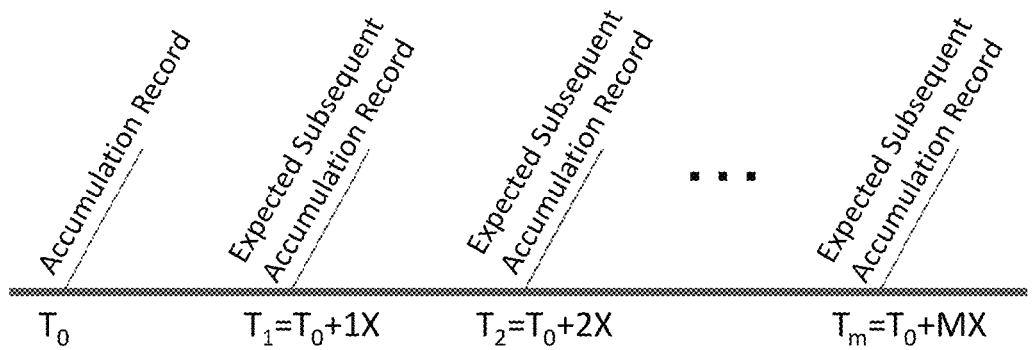
FIGS. 5, 6 and 7 illustrate exemplary timing diagrams of an automated secure record management system.
Figure 6:
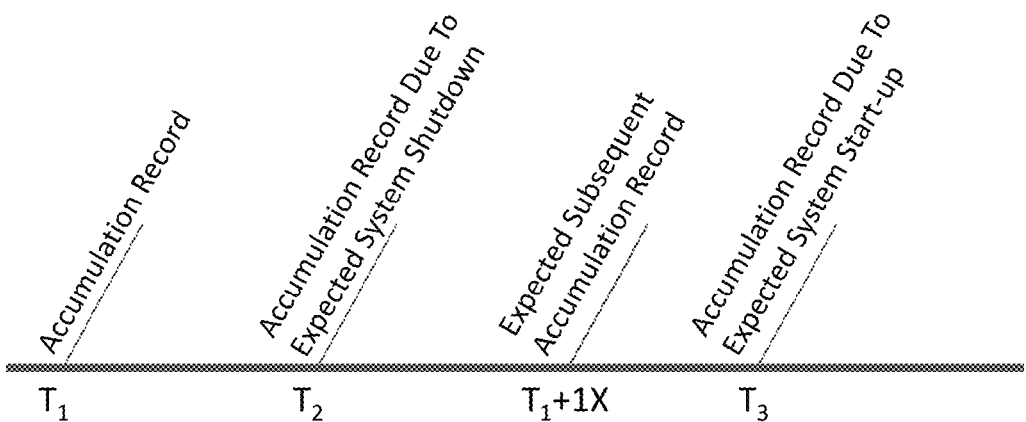
Figure 7:
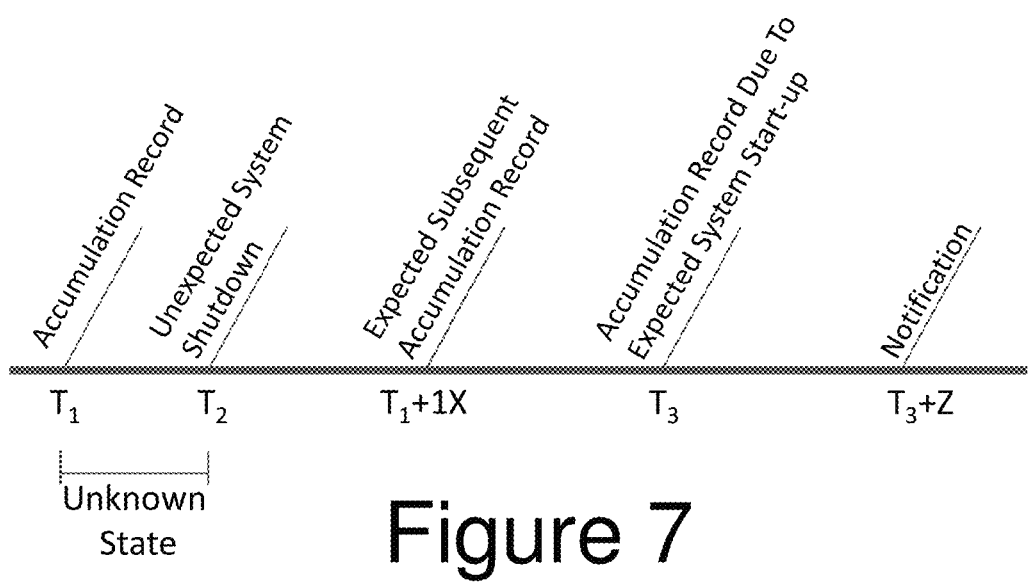

FIGS. 5-7 illustrate exemplary timing diagrams of an automated secure record management system. Particularly, FIG. 5 illustrates a timing diagram of a normal operation by an automated secure record management system; FIG. 6 illustrates a timing diagram that includes an expected shutdown of an automated secure record management system; and FIG. 7 illustrates a timing diagram that includes an unexpected shutdown of an automated secure record management system. FIGS. 5-7 further illustrate how tampering detection, based on generating validation data and performing on-demand validation, by the automated secure record management system may be performed. FIGS. 5-7 are described below with reference to FIG. 1.

As illustrated in FIG. 5, the facility 110 of the system 100 generates validation data in the form of an initial accumulation record at time T0. Further, based on configured time intervals 'X,' the facility 110 generates subsequent accumulation records at expected time T1 through time TM, where 'M' is an integer related to the number of time intervals that have lapsed since the beginning of the series. In turn, if during on-demand validation, by the utility module 118 of the system 100, one of the accumulation records is detected as missing, altered, and/or out of sequence, or if more than the expected accumulation records are encountered, then the system 100 may utilize this irregularity and generate (e.g., block 440, FIG. 4) a notification accordingly.

As illustrated in FIG. 6, the facility 110 of the system 100 generates validation data in the form of an accumulation record at time T1. The facility 110 should also generate validation data in the form of an expected subsequent accumulation record at time T1+1X, where 'X' is a configured time interval; however, the system 100 at time T2 experiences a scheduled shutdown, which is before the generation of the expected subsequent accumulation record at time T1+1X. In turn, the facility 110 generates accumulation record as a result of the shutdown, where a timestamp of that shutdown accumulation record is contained inside a window of time between time T1 and time T1 +1X (e.g., before the expected subsequent accumulation record is recorded).

FIG. 6 also illustrates that the shutdown accumulation record is followed by an accumulation record that results from the system 100 start-up processing at time T3. In turn, if during on-demand validation by the utility module 118 of the system 100 a scheduled system shutdown or system start-up is discovered, then the shutdown accumulation record at time T2 rather than at time T1+1X is utilized to identify any records processed in the final interval of the series and that shutdown accumulation record is utilized to determine whether there was tampering of the archived records. Further, because the shutdown of the system 100 was expected, no records were likely received between times T2 and time T3. Thus, if during on-demand validation, by the utility module 118 of the system 100, one of the shutdown/startup accumulation records is detected as missing, altered, and/or out of sequence, or if more than the expected accumulation records are encountered, then the system 100 utilizes this irregularity to generate (e.g., block 440, FIG. 4) a notification accordingly. For example, if any single record was removed, the running count would not match the signature record number (e.g., block 435, FIG. 4) in the accumulation record at time T2 or time T3; if any single record was manipulated, the digital signature check (e.g., block 425, FIG. 4) would fail, which includes invalid signatures of the accumulation records; and if an entire interval of data was removed, then the expected timestamp of the accumulation record at time T2 will also be irregular.

However, if the system spontaneously crashed without a proper shutdown procedure (e.g., no shutdown accumulation record was written containing a number of records between the last accumulation record and system shutdown), the nature of the validation data generated by the system 100 enables post-processing that may confirm whether there was tampering of the archived records.

As illustrated in FIG. 7, the facility 110 of the system 100 generates validation data in the form of an accumulation record at time T1. The facility 110 should also generate validation data in the form of an expected subsequent accumulation record at time T1+1X, where 'X' is a configured time interval; however, the system 100 experiences an unexpected shutdown (e.g., a system crash) at time T2. In this case, the shutdown accumulation record as described above may not be generated or written by the system 100, and in turn there may be a small window of an unknown state (e.g., a time between time T1 and time T2).

At this point, the unexpected shutdown may be identified by an accumulation record that is the result of system start-up processing at time T3 during on-demand validation. In turn, the utility module 118 during on-demand validation utilizes a value of the running counter and the signature record numbers of both the accumulation records at time T1 and time T3 to make an intelligent inference of what records may have existed during the unknown state and between time T2 and time T3. A notification at time T3+Z (where 'Z' is a configured time interval) may be provided indicating manual review with respect to the shutdown event and on-demand validation may resume from the accumulation record generated at time T3.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method performed by a computer comprising a processor and a memory, comprising:
   receiving, by the processor, a plurality of digitally signed records subsequent to a resetting of a running counter, wherein a record is a digital representation of an activity or a log of that activity processed within the computer, wherein each digitally signed record of the plurality of digitally signed records includes a digital signature;
   incrementing the running counter in response to each digitally signed record received;
   detecting a shutdown before receiving an accumulation record, wherein the accumulation record comprises a counter record generated at a time interval and a unique digital signature associated with the counter record, wherein the counter record is configured to memorialize a value of the running counter in a signature record number;
   generating the accumulation record as a result of the shutdown;
   comparing the value of the running counter and the signature record number of the accumulation record in response to receiving the accumulation record;
   validating each received digitally signed record against the corresponding digital signature; and
   generating a notification, whenever the comparing detects that the value of the running counter is not equal to the signature record number or whenever the validating detects that any received digitally signed record fails to match the corresponding digital signature.

2. The method of claim 1, further comprising:
   receiving an initial accumulation record, the initial accumulation record including an initial signature record number set to an initial value and a flag, the flag indicating that the initial accumulation record is a first accumulation record in a sequence of accumulation records; and
   resetting the running counter in response to receiving the initial accumulation record.

3. The method of claim 1, further comprising:
   detecting an unexpected system shutdown before receiving the accumulation record, wherein the shutdown is the unexpected system shutdown; and
   generating the notification in response to the system shutdown, the notification including the value of the running counter and an interval time of the system shutdown.

4. The method of claim 1, wherein the accumulation record includes:
   a flag indicating whether the accumulation record is a first accumulation record in a sequence of accumulation records;
   a temporal identifier identifying when the accumulation record was generated;
   a next accumulation record temporal identifier indicating when a subsequent accumulation record in the sequence of accumulation records will be generated.

5. The method of claim 1, wherein the receiving of the accumulation record comprises generating the accumulation to include the unique digital signature and the signature record number at the time interval identified by an interval counter.

6. A computer program product, the computer program product comprising a non-transitory computer readable storage medium having program instructions embodied therewith, the program instructions executable by a processor to cause:
   receiving, by the processor, a plurality of digitally signed records subsequent to a resetting of a running counter, wherein a record is a digital representation of an activity or a log of that activity processed within the computer, wherein each digitally signed record of the plurality of digitally signed records includes a digital signature;
   incrementing, by the processor, the running counter in response to each digitally signed record received;
   detecting a shutdown before receiving an accumulation record, wherein the accumulation record comprises a counter record generated at a time interval and a unique digital signature associated with the counter record, wherein the counter record is configured to memorialize a value of the running counter in a signature record number;
   generating the accumulation record as a result of the shutdown;
   comparing, by the processor, the value of the running counter and the signature record number of the accumulation record in response to receiving the accumulation record;
   validating each received digitally signed record against the corresponding digital signature; and
   generating, by the processor, a notification whenever the comparing detects that the value of the running counter is not equal to the signature record number or whenever the validating detects that any received digitally signed record fails to match the corresponding digital signature.

7. The computer program product of claim 6, wherein the program instructions are further executable by the processor to cause:
   receiving an initial accumulation record, the initial accumulation record including an initial signature record number set to an initial value and a flag, the flag indicating that the initial accumulation record is a first accumulation record in a sequence of accumulation records; and
   resetting the running counter in response to receiving the initial accumulation record.

8. The computer program product of claim 6, wherein the program instructions are further executable by the processor to cause:
   detecting an unexpected system shutdown before receiving the accumulation record, wherein the shutdown is the unexpected system shutdown; and
   generating the notification in response to the system shutdown, the notification including the value of the running counter and an interval time of the system shutdown.

9. The computer program product of claim 6, wherein the accumulation record includes:

a flag indicating whether the accumulation record is a first accumulation record in a sequence of accumulation records;

a temporal identifier identifying when the accumulation record was generated;

a next accumulation record temporal identifier indicating when a subsequent accumulation record in the sequence of accumulation records will be generated.

10. A system, comprising:

a processing device configured to:

receive a plurality of digitally signed records subsequent to a reset of a running counter, wherein a record is a digital representation of an activity or a log of that activity processed within the computer, wherein each digitally signed record of the plurality of digitally signed records includes a digital signature;

increment the running counter in response to each received digitally signed record;

detect a shutdown before receiving an accumulation record, wherein the accumulation record comprises a counter record generated at a time interval and a unique digital signature associated with the counter record, wherein the counter record is configured to memorialize a value of the running counter in a signature record number;

generate the accumulation record as a result of the shutdown;

compare the value of the running counter and the signature record number of the accumulation record in response to the received accumulation record;

validate each received digitally signed record against the corresponding digital signature; and generate a notification whenever the comparison detects that the value of the running counter is not equal to the signature record number or whenever the validating detects that any received digitally signed record fails to match the corresponding digital signature.

11. The system of claim 10, wherein the processing device is further configured to:

receive an initial accumulation record, wherein the initial accumulation record includes an initial signature record number set to an initial value and a flag, wherein the flag indicates that the initial accumulation record is a first accumulation record in a sequence of accumulation records; and reset the running counter in response to receiving the initial accumulation record.

12. The system of claim 10, wherein the processing device is further configured to:

detect an unexpected system shutdown before the accumulation record is received, wherein the shutdown is the unexpected system shutdown; and generate the notification in response to the system shutdown, wherein the notification includes the value of the running counter and an interval time of the system shutdown.

13. The system of claim 10, wherein the accumulation record includes:

a flag configured to indicate whether the accumulation record is a first accumulation record in a sequence of accumulation records;

a temporal identifier configured to identify when the accumulation record was generated;

a next accumulation record temporal identifier configured to indicate when a subsequent accumulation record in the sequence of accumulation records will be generated.

* * * * *